March 20, 1962 G. E. MILLER 3,025,594
APPARATUS FOR ASSEMBLING HELICAL SPRINGS ON OBJECTS
Filed Sept. 6, 1960 3 Sheets-Sheet 1

INVENTOR.
G. E. MILLER
BY
J. J. Landis
ATTORNEY

March 20, 1962

G. E. MILLER 3,025,594

APPARATUS FOR ASSEMBLING HELICAL SPRINGS ON OBJECTS

Filed Sept. 6, 1960

INVENTOR.
G. E. MILLER
BY J. L. Landis
ATTORNEY

United States Patent Office 3,025,594
Patented Mar. 20, 1962

1

3,025,594
APPARATUS FOR ASSEMBLING HELICAL
SPRINGS ON OBJECTS
Glenn E. Miller, Rockbrook Heights, Nebr., assignor to Western Electric Company, Incorporated, a corporation of New York
Filed Sept. 6, 1960, Ser. No. 54,085
8 Claims. (Cl. 29—227)

The present invention relates generally to apparatus for assembling helical springs on objects, and more particularly to apparatus for assembling a helical spring on an end of a pin that is somewhat larger in diameter than the inner diameter of at least a portion of the spring.

Accordingly, the general object of the invention is to provide new and improved apparatus for assembling helical springs, or other radially expansible articles, on objects.

Another object is to provide new and improved apparatus for assembling a helical spring on an end of a pin that is somewhat larger in diameter than the inner diameter of at least a portion of the spring.

Another object of the invention is to provide new and improved apparatus for quickly forming a succession of assemblies consisting of a spring and a pin where each spring has a small coil at one end which must be expanded to permit assembly over one end of the pin.

With the foregoing and other objects in view, an apparatus in accordance with the invention is designed for assembling a helical spring on an object which is somewhat larger than the inner diameter of at least a portion of the spring. Such an apparatus may include a mechanism for clamping the object, and a tapered mandrel having a large end of substantially the same size as the object. The mandrel also has a small end on which the spring is placed at the start of the assembling operation. A releasable mechanism is provided for clamping the mandrel in an initial position with its large end spaced from the object and in alignment therewith.

A pushing mechanism is also provided, which is initially spaced from the small end of the mandrel, together with a reciprocable mechanism for moving the pushing mechanism forward from the initial position toward the mandrel and then back to the initial position. The pushing mechanism is designed, upon forward movement thereof, for receiving a portion of the mandrel therewithin so as to support the mandrel. The mandrel-clamping mechanism is released by a mechanism responsive to a predetermined amount of forward movement of the pushing mechanism, after the mandrel has been received within the pushing mechanism and is supported thereby so that the mandrel is thereafter carried forward by the pushing mechanism into engagement with the object. The pushing mechanism thereafter pushes the spring over the large end of the mandrel and onto the object upon further forward movement thereof. In addition, a mechanism is provided, resiliently mounted within the pushing mechanism and depressed to a nongripping position by the mandrel during the spring-inserting operation, for lightly gripping the mandrel a predetermined length of time after the pushing mechanism has begun movement back to the initial position to carry the mandrel back toward its initial position. A mechanism responsive to a predetermined amount of backward movement of the pusher mechanism recloses the mandrel-clamping mechanism after the pushing mechanism has returned the mandrel to its initial position to reclamp the mandrel in its initial position.

Other objects, advantages and aspects of the invention will become apparent from the following detailed description of a specific embodiment thereof, when taken in conjunction with the accompanying drawings, in which:

2

Figure 1:
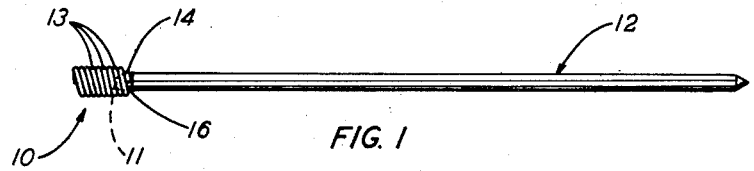
FIG. 1 illustrates an assembly of a helical spring and a pin, which may be produced by apparatus according to the invention.
Figure 2:
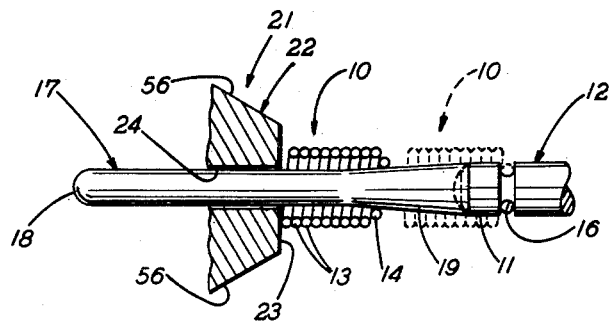
FIG. 2 is a somewhat diagrammatic view showing the way in which the spring is pushed over a tapered mandrel onto a free end of the pin.

Referring now in detail to the drawings, and particularly to FIGS. 1 and 2, the subject apparatus is designed to assemble a helical spring 10 on a left end 11 of a generally cylindrical pin 12 to form a spring-and-pin assembly used in perforators for automatic message accounting equipment. The first nine coils 13—13 from the left of the spring 10 have an inner diameter somewhat larger than the diameter of the pin 12 so as to permit them to slip readily over the pin 12; however, a right end coil 14 is much smaller and may not be placed on the pin 12 unless that coil is first expanded radially. The small coil 14 is designed for reception in a circumferential groove 16 formed around the pin 12 near the left end 11. When the spring 10 is properly assembled on the pin 12, the small coil 14 is received in the groove 16 and the remaining coils 13—13 project to the left beyond the left end 11 of the pin 12.

Referring specifically to FIG. 2, a tapered mandrel 17 is provided to expand the small coil 14 of the spring 10 sufficiently to permit it to be pushed onto the pin 12, from an initial position shown in solid lines to an assembled position shown in phantom lines. The mandrel 17 is provided with a relatively long shaft 18 at the left end thereof, which is of a sufficiently small diameter to permit slidable reception of the small coil 14 thereover. At the start of the assembling operation, the spring 10 is placed on the mandrel shaft 18 so that the small coil 14 faces the pin 12.

The mandrel 17 is also provided with an end section 19 tapering to a large end having a diameter substantially equal to that of the pin 12. The spring 10 is pushed from left to right, as viewed in FIG. 2, over the tapered mandrel section 19 and then over the left end 11 of the pin 12 until the small coil 14, which has been expanded radially by passage over the tapered mandrel section 19, snaps into the assembled position in the groove 16. After this assembly has been accomplished, the mandrel 17 is withdrawn from right to left leaving the spring 10 properly assembled on the pin 12.

A mechanism is provided, designated generally by the numeral 21 and illustrated partially in FIG. 2, for pushing the spring 10 along the mandrel 17 and onto the pin 12. The mechanism 21 includes a pusher block 22 having a flat nose portion 23 at the front face thereof that is designed for engaging and pushing against the left end of the spring 10. The pusher block 22 also includes a bore 24 in the front face thereof that is designed to receive the mandrel shaft 18 slidably therein.

The length of the tapered mandrel section 19 is preferably made substantially equal to the length of the spring 10 minus the distance of the groove 16 from the left end 11 of the pin 12, so as to permit pushing of the spring 10 onto the pin 12 by the pusher block 22. The tapered section 19 could be made shorter, but could not be made longer without also employing a radially expansible pusher that would slide on the tapered mandrel section 19.

Figure 3:
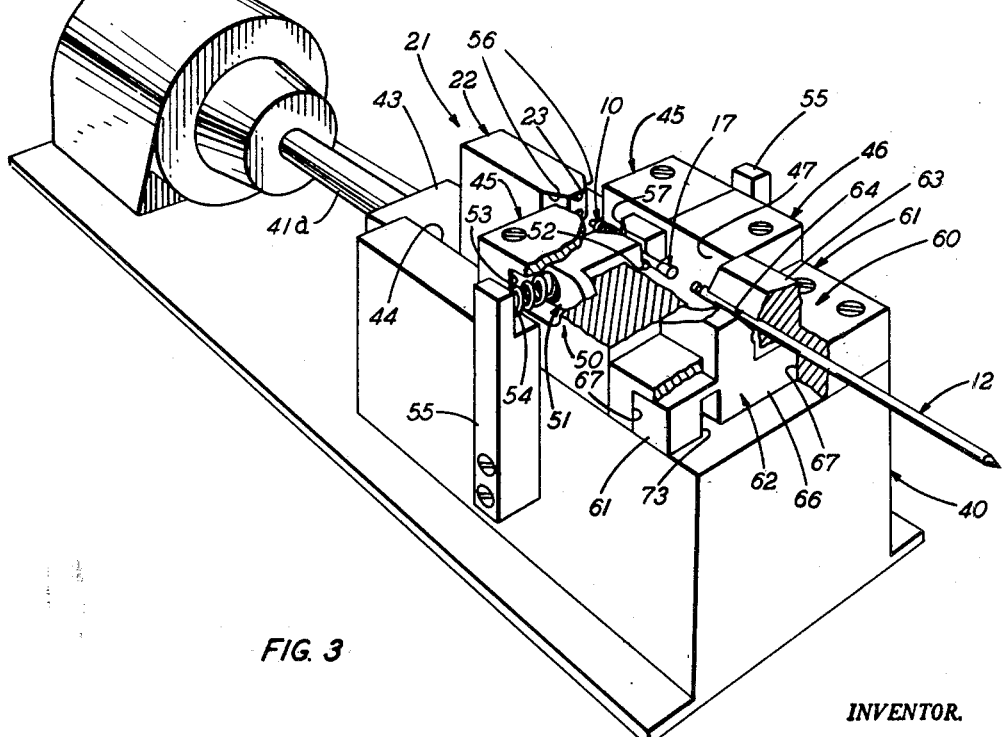
FIG. 3 is a perspective view, with portions broken away, of a complete spring-assembling apparatus in accordance with one specific embodiment of the invention.
Figure 4:
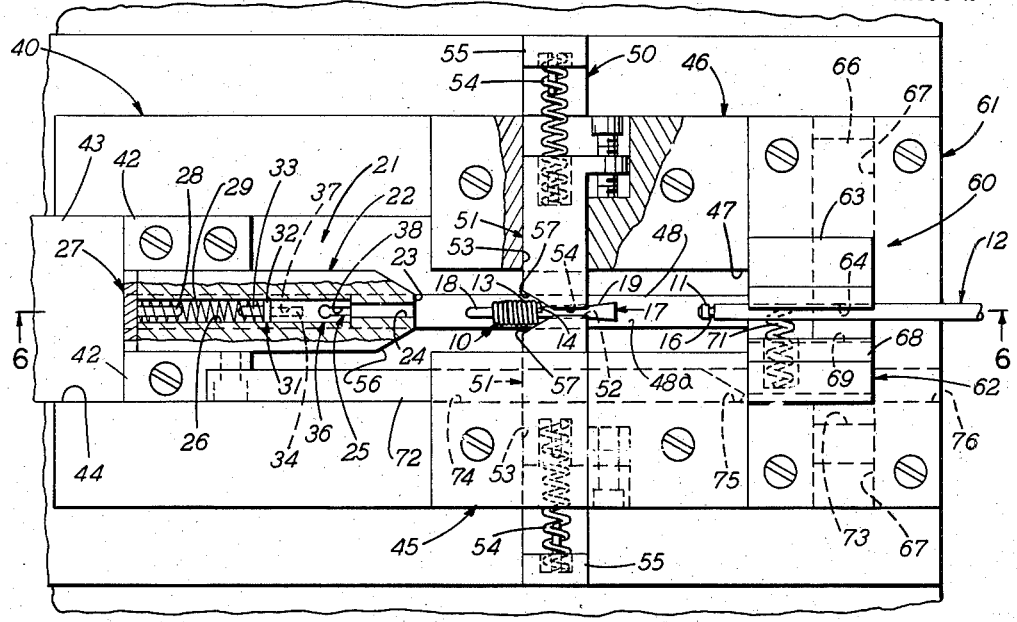
FIG. 4 is a top plan view, with portions broken away, of a major portion of the apparatus illustrated in FIG. 3 and showing certain movable elements in their initial positions.
Figure 5:
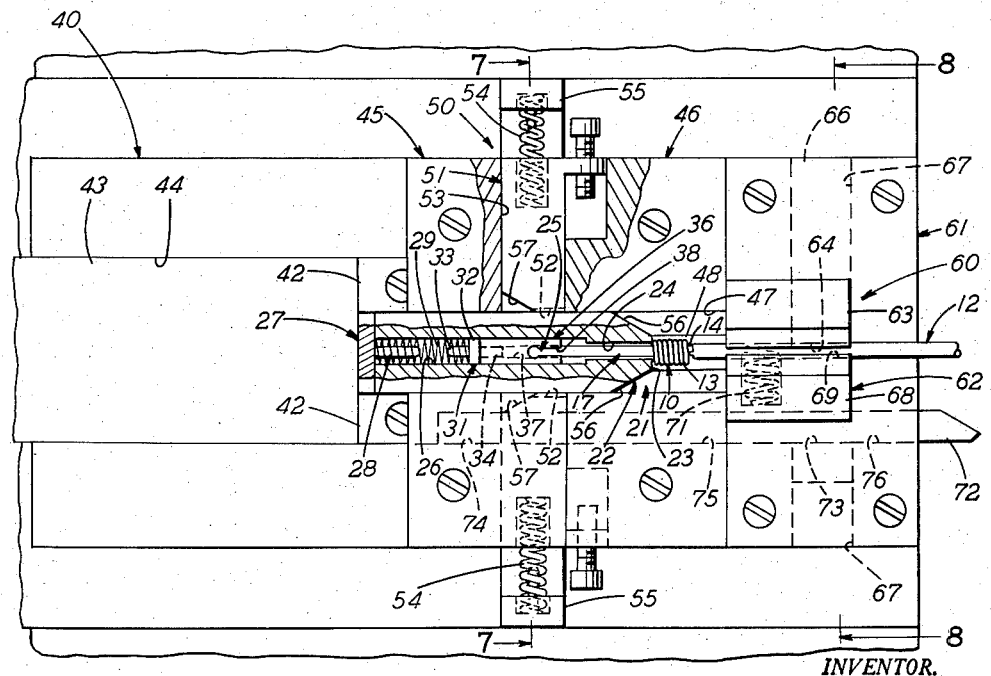
FIG. 5 is a view similar to FIG. 4, but illustrating the movable elements in their spring-assembling positions.

Referring now to FIGS. 3, 4 and 5, the pusher block 22 is shown in FIGS. 3 and 4 in an initial position spaced from the mandrel 17 prior to the start of a spring-assembling operation, while in FIG. 5 the pusher block 22 is shown moved to a forward or spring-assembling position. A mechanism is provided within the pusher block 22, designated generally by the numeral 25 and best illustrated in FIGS. 4, 5 and 6, for lightly gripping the mandrel shaft 18 as the pusher block moves back to the initial position after the spring-assembling operation, so as to carry the mandrel 17 back toward an initial position thereof.

The gripping mechanism 25 is received within a closed counterbore 26 formed in the block 22 and extending rearwardly from the bore 24 along the remainder of the length thereof. A forward wall of the counterbore 26 is defined at the juncture of the bore 24 and counterbore 26. The mechanism 25 includes a retaining plate 27 that is bolted to the left end of the pusher block 22 so as to close the counterbore 26. The retaining plate 27 is provided with a pin 28 which projects to the right from the plate 27 into the counterbore 26. A compression spring 29 is received within the counterbore 26 on the pin 28, between the plate 27 and a floating retaining member designated generally by the numeral 31. The member 31 is provided with a central flange 32 against which the spring 29 is received, a pin 33 projecting to the left therefrom on which the other end of the spring 29 is received, and a pin 34 projecting to the right therefrom.

Figure 6:
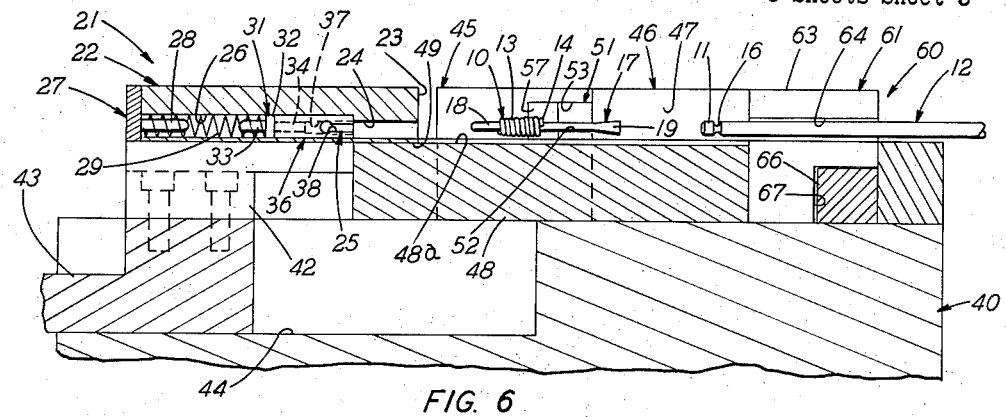
FIG. 6 is a vertical section taken generally along the line 6—6 of FIG. 4, and illustrating further details of the apparatus.

A cylindrical collet, designated generally by the numeral 36 and having an axial bore 37 extending therethrough (FIG. 6), is received slidably in the counterbore 26 with a driving fit on the pin 34 so that the retaining member 31 is, in effect, secured to the collet 36 for movement therewith to the left and right as viewed in FIGS. 4, 5 and 6. The collet 36 is normally urged by the compression spring 29 to a position shown in FIGS. 4 and 6, where its right or forward end abuts the forward (or right-end) wall of the counterbore 26.

The diameter of the bore 37 of the collet 36 is such that the mandrel shaft 18 may be received slidably therein whenever the collet 36 is not being urged by the spring 29 against the forward wall of the counterbore 26. The collet 36 is also formed with a series of four longitudinal slots 38—38 therethrough at the forward end thereof so that, when the mandrel shaft 18 is received within the bore 37 and the collet 36 is then urged by the spring 29 against the forward wall of the counterbore 26, the collet 36 will grip the mandrel shaft 18 lightly so as to constrain movement of the mandrel 17 with the pusher block 22. This gripping action occurs during the return movement of the pusher block 22 to its initial position, and is effective to return the mandrel 17 therewithin to its initial position.

Considering now the reciprocation of the pusher block 22 between the initial position of FIG. 4 and the forward position of FIG. 5, the block 22 is mounted for sliding movement to the left and right on a flat-surfaced, main supporting block designated generally by the numeral 40. The pusher block 22 is reciprocated by any suitable drive mechanism, such as a fluid cylinder designated generally by the numeral 41 (FIG. 3) and having a piston rod 41a. A pair of L-shaped, depending leg portions 42—42 formed on opposite sides of the pushed block 22 at the left end thereof (FIGS. 3, 4 and 6) are bolted to a slide member 43 that is secured to the piston rod 41a for constrained reciprocation within a rectangular guideway 44 defined in the upper surface of the main supporting block 40 at the left end thereof.

As best illustrated in FIGS. 3, 4, 5 and 7, a pair of short guide blocks 45—45 are secured atop the main supporting block 40 in spaced relationship to each other on opposite sides of the path of movement of the pusher block 22 so as to guide the pusher block 22 for sliding movement therebetween. A long guide block 46, which covers the entire width of the main supporting block 40, is secured atop the block 40 to the right of the guide blocks 45—45 and adjacent thereto. The block 46 is formed with a central passageway 47 (of the same width as the distance between the blocks 45—45) for guiding the pusher block 22 for sliding movement within the block 46 to the forward position shown in FIG. 5.

Figure 7:
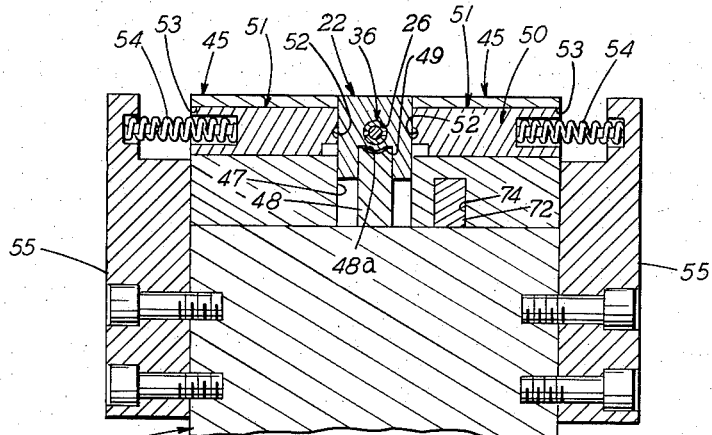
FIG. 7 is a vertical section taken generally along the line 7—7 of FIG. 5 and illustrating particularly a releasable mechanism for clamping the mandrel.

The block 46 is also provided with a thin elongated guideway 48 at the center thereof, which extends a considerable distance to the left therefrom between the spaced blocks 45—45, so as to support a portion of the pusher block 22. Referring to FIG. 7, the upper surface of the guideway 48 is formed with a semicircular groove 48a that slidably supports a curved lower surface 49 of the pusher block 22, which surface constitutes the lower wall of the counterbore 26.

A releasable mechanism is provided, designated generally by the numeral 50, for clamping the mandrel 17 in an initial position (best illustrated in FIGS. 4 and 6) in axial alignment with the pin 12 and the bore 24 in the pusher block 22 so that the mandrel 17 is spaced from both the pin 12 and the pusher block 22. The mandrel-clamping mechanism 50 is released upon forward movement of the pusher block 22 after the mandrel shaft 18 has been received within the pusher block 22 and is supported thereby. As the pusher block 22 returns to the initial position at the end of each spring-assembling operation, carrying the mandrel 17 therewith back toward its initial position, the clamping mechanism 50 is reactuated to reclamp the mandrel 17 in its initial position. The clamping mechanism 50 is designed to overcome the light gripping action of the mechanism 25 within the pusher block 22 whereby the pusher block 22 is disengaged from the mandrel shaft 18 and returns to its initial position spaced therefrom.

One specific mandrel-clamping mechanism 50 in accordance with the invention is best illustrated in FIGS. 4, 5 and 7, and includes a pair of opposed clamping jaws designated generally by the numerals 51—51, which are mounted on opposite sides of the mandrel 17 for sliding movement toward and away from each other, respectively to clamp and unclamp the mandrel 17. The clamping jaws 51—51 are provided with aligned semicircular grooves 52—52 in the front faces thereof for receiving and clamping the mandrel shaft 18 between the jaws 51—51. Each jaw 51 is received in a transverse slot 53 formed through the guide blocks 45—45 for sliding movement within the blocks 45—45 adjacent to the guide block 46. The jaws 51—51 are normally biased toward each other into clamping position by a pair of compression springs 54—54, which are received within receiving wells in the jaws 51—51 and similar wells in a pair of fixed retaining plates 55—55. The plates 55—55 are bolted to the main supporting block 40 and extend upward therefrom, as best illustrated in FIG. 7, so as to form a solid base for the springs 54—54.

At the start of each spring-assembling operation, the pusher block 22 occupies the initial or leftward position shown in FIG. 4, at which time the springs 54—54 urge the mandrel-clamping jaws 51—51 together so as to grip the mandrel shaft 18 in the manner shown. After the spring 10 has been placed on the mandrel shaft 18, the pusher block 22 is moved forward by the air cylinder 41 until the mandrel shaft 18 is received and supported within the pusher block 22 and the collet 36 therewithin. Thereafter, a pair of tapered camming surfaces 56—56, which are formed at the front end of the pusher block 22 and taper outwardly away from the nose portion 23, engage a pair of correspondingly tapered camming surfaces 57—57 constituting the rear or left-front faces of the clamping jaws 51—51 so as to push the jaws 51—51 apart to the positions shown in FIGS. 5 and 7. The pusher block 22 then slides past the jaws 51—51 and carries the mandrel 17 forward into engagement with the pin 12.

As the pusher block 22 returns from the spring-assembling position of FIG. 5 to the initial position of FIG. 4 carrying the mandrel 17 therewith, the camming surfaces 56—56 on the pusher block 22 slide past the corresponding camming surfaces 57—57 on the jaws 51—51. When this occurs, the clamping jaws 51—51 are forced together by the springs 54—54 so as to reclamp the mandrel 17 in its initial position. The jaws 51—51 overcome the light gripping action of the collet 36 and thus extricate the mandrel 17 from the pusher block 22, whereafter the pusher block 22 is free to return to the initial position spaced from the mandrel 17 to permit insertion of another spring 10 on the mandrel shaft 18 in preparation for the next spring-assembling operation.

Figure 8:
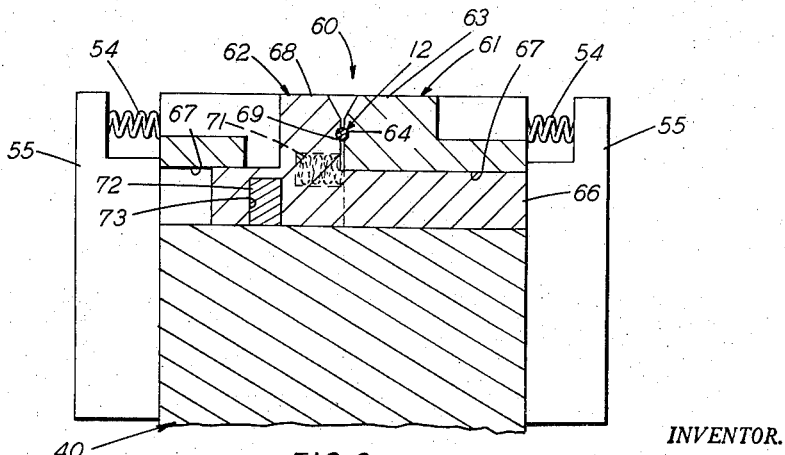
FIG. 8 is a vertical section taken generally along the line 8—8 of FIG. 5 and illustrating particularly a releasable mechanism for clamping the pin.

A releasable mechanism is provided, designated generally by the numeral 60 and best illustrated in FIGS. 5 and 8, for clamping a succession of the pins 12—12 in a fixed position so that the left end 11 thereof is free. Each pin 12 is clamped in spaced aligned relationship with respect to the mandrel 17 in the initial position thereof shown in FIGS. 4 and 6. One specific pin-clamping mechanism 60 is illustrated in the drawings, and includes a fixed clamping block 61 and a movable clamping block 62.

The fixed block 61 is bolted across the top of the main supporting block 40 and includes an upstanding jaw 63 having a semicircular groove 64 for gripping one side of the pin 12. The movable block 62 includes a slide portion 66 that is received in a pair of transverse slots 67—67 formed in the fixed block 61. The block 62 also includes an upstanding jaw 68 having a semicircular groove 69, which co-operates with the groove 64 in the jaw 63 to hold the pin 12 in place.

A compression spring 71 is received within a well in the movable block 62 and bears against the fixed block 61 so as normally to bias the two die blocks slightly apart to permit insertion and removal of a succession of pins 12—12 between the jaws 63 and 68. A long wedge 72 is carried by the pusher block 22 and is designed for reception in a camming slot 73 that is formed in the slide portion 66 of the movable block 62 eccentrically with respect to the wedge 72. As the pusher block 22 approaches the mandrel 17, the wedge 72 enters the slot 73 so as to cam the movable clamping block 62 toward the fixed clamping block 61 to clamp the pin 12. The wedge 72 slides on the upper surface of the main supporting block 40 and is slidably received, in order, within a longitudinal slot 74 (FIGS. 4, 5 and 7) formed in the front one of the guide blocks 45—45, a similar slot 75 (FIGS. 4 and 5) formed in the guide block 46, and a slot 76 (FIGS. 4 and 5) at the right side of the fixed clamping block 61, in addition to the camming reception within the slot 73 in the movable clamping block 62.

*Operation*

Reviewing now the operation of the apparatus, a pin 12 is first inserted from right to left, as viewed in FIGS. 3, 4 and 6, between the jaws 63 and 68 of the pin-clamping mechanism 60, where the pin is then loosely held. At this time, the mandrel 17 is already clamped between the jaws 51—51 of the mandrel-clamping mechanism 50 so that the mandrel shaft 18 projects to the left therefrom, as viewed in FIGS. 4 and 6. A spring 10 is then placed over the left end of the mandrel shaft 18 so that the small coil 14 points toward the pin 12.

The air cylinder 41 is then operated to move the pusher block 22 forward, or to the right as viewed in FIGS. 3, 4, 5 and 6, which movement operates automatically to assemble the spring 10 on the pin 12 in the following fashion:

(1) on forward movement of the pusher block 22, the wedge 72 cams the movable clamping block 62 toward the fixed block 61 (FIG. 8), against the urging of the spring 71, to clamp the pin 12 tightly;

(2) during a first portion of this forward movement, the bore 24 at the right end of the pusher block 22 advances over the left end of the clamped mandrel shaft 18 until that shaft is received in the bore 37 (FIG. 6) in the collet 36 so that the mandrel 17 is supported by the pusher block 22 for forward movement therewith;

(3) after the mandrel 17 is so supported, and on continued forward movement of the pusher block 22, the camming surfaces 56—56 of the pusher block 22 push the mandrel-clamping jaws 51—51 apart (to the positions shown in FIGS. 5 and 7), against the urging of the springs 54—54, so that the pusher block 22 slides therepast carrying the mandrel 17 toward the clamped pin 12;

(4) on further forward movement of the pusher block 22, the right end of the mandrel 17 strikes and lodges against the left end of the clamped pin 12, as best illustrated in FIGS. 2 and 5;

(5) on still further forward movement, the pusher block 22 slides over the now-stationary mandrel shaft 18 whereby the nose portion 23 at the front face thereof engages and pushes the spring 10 onto the pin 12, expanding the small coil 14 as it passes over the tapered end 19 of the mandrel, until the small coil 14 snaps in place in the groove 16; and (6) during this last movement, the mandrel shaft 18 is received further into the pusher block 22 until the collet 36 compresses the collet-biasing spring 29 to the position illustrated in FIG. 5.

After the assembling operation has thus been accomplished, the air cylinder 41 is operated so as to move the pusher block 22 back to its initial position, and the following operations occur:

(1) as the pusher block 22 recedes, the mandrel 17 remains approximately in place against the left end of the pin 12 because the collet-biasing spring 29 pushes the collet 36 to the right, as viewed in FIG. 5, until the collet 36 strikes the forward wall of the counterbore 26;

(2) then, the spring 29 forces the collet 36 against the forward wall of the counterbore so that the collet grips the mandrel shaft 18 lightly near the left end thereof, whereafter the collet 36 and mandrel 17 move to the left with the pusher block 22;

(3) as the camming surfaces 56—56 of the pusher block 22 pass the tapered surfaces 57—57 of the clamping jaws 51—51 (FIGS. 4 and 5), those jaws are forced inward by the springs 54—54 so as to clamp the mandrel shaft 18 with sufficient force to pull the mandrel 17 out of the collet 36 and hold the mandrel 17 in place for the next assembling operation; and (4) finally, as the pusher block 22 returns to its initial position, the wedge 72 withdraws from the camming slot 73 in the movable clamping block 62, whereby the spring 71 forces the block 62 away from the block 61 sufficiently to permit ready withdrawal of the assembled spring 10 and pin 12.

While one specific embodiment of the invention has been described in detail hereinabove, it will be obvious that various modifications may be made from the specific details described without departing from the spirit and scope of the invention. For simplicity in definition, the phrase "helical spring," as used in this application, is intended to include not only springs, such as the spring 10 having one or more coils that must be expanded to permit assembly on a generally cylindrical article, but also various other types of radially expansible articles having at least a portion which must be expanded to permit assembly on an object.

What is claimed is:

1. Apparatus for assembling a helical spring on an object which is somewhat larger than the inner diameter of at least a portion of the spring, which comprises means for clamping the object; a mandrel having a shaft on which the spring is placed at the start of the assembling operation and an end section tapering to a large end of substantially the same size as the object; releasable means for clamping the mandrel shaft in an initial position so that the large end of the mandrel is spaced from the object and is in alignment therewith; a pusher block initially spaced from the mandrel shaft and having a front face with a bore therein in alignment with the mandrel shaft; reciprocable means for moving said pusher block forward from the initial position toward said mandrel and then back to the initial position, said pusher block being designed on forward movement thereof for receiving a portion of the mandrel shaft within the bore so as to support said mandrel; means, responsive to a predetermined amount of forward movement of said pusher block, for releasing said mandrel-clamping means after said mandrel has been received within said pusher block and is supported thereby, so that said mandrel is thereafter carried forward by said pusher block into engagement with the object, the front face of said pusher block thereafter pushing the spring over the large end of said mandrel and onto the object upon further forward movement thereof; means, resiliently mounted within said pusher block and depressed to a nongripping position by said mandrel during the spring-inserting operation, for lightly gripping the mandrel shaft a predetermined length of time after said pusher block has begun movement back to the initial position to carry said mandrel back toward its initial position; and means responsive to a predetermined amount of backward movement of said pusher block for reclosing said mandrel-clamping means after said pusher block has returned said mandrel to its initial position to reclamp the mandrel in its initial position, said mandrel-clamping means being designed to overcome the action of said gripping means whereby said pusher block is disengaged from the mandrel shaft and returns to its initial position spaced therefrom.

2. The apparatus as recited in claim 1, wherein the pusher block is formed with a closed counterbore extending rearwardly from the bore, a forward wall of the counterbore being defined at the juncture of the bore and counterbore; and wherein the gripping means includes a cylindrical collet received slidably within the counterbore and having an axial bore for receiving the mandrel shaft therewithin, and resilient means within the counterbore for urging said collet into engagement with the forward wall of the counterbore, said collet being provided with longitudinal slots at the forward end thereof and being so designed that the mandrel shaft may be received slidably in the bore of the collet whenever said collet is not being urged against the forward wall of the counterbore but so that said collet grips a mandrel shaft within the bore thereof whenever said collet is being urged against the forward wall of the counterbore, whereby during the forward movement of the pusher block the mandrel shaft enters the bore in said collet and depresses said collet within the counterbore against said resilient means, and whereby during the movement of the pusher block back to the initial position the resilient means urges said collet against the forward wall of the counterbore and said collet grips the mandrel shaft until such time as it is forcibly removed therefrom by the reactuation of the mandrel-clamping means.

3. The apparatus as recited in claim 2, wherein a retaining plate is secured to the pusher block so as to close the rear end of the counterbore and has a pin projecting into the counterbore; wherein the resilient means comprises a compression spring received against the retaining plate on the pin thereof; and wherein a floating retaining member is received within the counterbore between the compression spring and the collet, said retaining member having a flange against which the compression spring is received and a first pin projecting therefrom on which the other end of the compression spring is received, the retaining member having a second pin projecting therefrom which is received with a driving fit in the bore of the collet so as to secure the retaining member to the collet for movement therewith.

4. The apparatus as recited in claim 1, wherein the mandrel-clamping means includes a pair of opposed clamping jaws mounted on opposite sides of the mandrel for movement relatively toward and away from each other, resilient means for normally urging said clamping jaws together so as to grip the mandrel shaft, and camming means on the pusher block for forcing said clamping jaws apart to permit passage of the pusher block therebetween when the mandrel has been received within the pusher block and is supported thereby.

5. The apparatus as recited in claim 4, wherein both mandrel-clamping jaws are movable and are normally urged together by the resilient means, wherein the pusher block is formed with a pair of outwardly tapered camming surfaces extending rearwardly from the front face thereof, and wherein the clamping jaws are formed with correspondingly tapered camming surfaces constituting the rear faces thereof, whereby the pusher block forces the clamping jaws apart upon forward movement therepast and permits reclosure of the clamping jaws by the resilient means upon rearward movement therepast.

6. The apparatus as recited in claim 1, wherein the object-clamping means includes a pair of opposed clamping jaws mounted for movement relatively toward and away from each other, resilient means for normally urging said clamping jaws slightly apart so that the object may readily be inserted therebetween, and camming means carried by the pusher block for forcing said clamping jaws together to grip the object upon forward movement of the pusher block.

7. The apparatus as recited in claim 6, wherein one object-clamping jaw is fixed and the other is movable and is normally urged away from the fixed jaw by the resilient means, wherein the movable jaw is provided with a slot therethrough, and wherein a wedge is carried by the pusher block eccentrically with respect to the slot and is designed to enter the slot upon forward movement of the pusher block to force the movable jaw toward the fixed jaw into clamping engagement with the object.

8. Apparatus for assembling a succession of helical springs on one end of a succession of cylindrical pins which are somewhat larger in diameter than the inner diameter of at least a portion of the springs, which comprises a pair of opposed and normally open jaws for clamping each pin so that the end thereof on which a spring is to be assembled is free; a mandrel having a shaft on which a spring is placed at the start of each assembling operation and an end section tapering to a large end having a diameter substantially the same as the diameter of the pin; a pair of opposed and normally closed jaws for clamping the mandrel shaft in an initial position so that the large end of the mandrel is spaced from the free end of the pin and is in alignment therewith; resilient means for urging said mandrel-clamping jaws to the closed position; a pusher block initially spaced from the mandrel shaft and having a front face with a bore therein in alignment with the mandrel shaft; reciprocable means for moving said pusher block forward from the initial position toward said mandrel and then back to the initial position each time it is desired to assemble a spring on a pin, said pusher block being designed on forward movement thereof for receiving a portion of the mandrel shaft within the bore so as to support said mandrel; a first camming means carried by the pusher block for forcing said pin-clamping jaws together to grip each pin upon forward movement of the pusher block; second camming means on the pusher block for forcing said mandrel-clamping jaws apart, against the action of said resilient means, to permit passage of the pusher block therebetween when the mandrel has been received within the pusher block and is supported thereby, said mandrel being carried forward by said pusher block into engagement with the pin, the front face of said pusher block thereafter pushing the spring over the large end of said mandrel and onto the pin upon further forward movement thereof; and a spring-biased collet within said pusher block for lightly gripping the mandrel shaft as said pusher block moves back to the initial position to carry said mandrel back toward its initial position, said mandrel-clamping jaws being returned to the closed position by said resilient means to reclamp said mandrel, said second camming means being designed to permit the closure of said mandrel-clamping jaws when said pusher block returns said mandrel to its initial position, said mandrel-clamping jaws being designed to overcome the action of said collet whereby said pusher block is disengaged from the mandrel shaft and returns to its initial position spaced therefrom, said pin-clamping jaws being reopened by said first camming means as said pusher block returns to its initial position.

References Cited in the file of this patent

UNITED STATES PATENTS 2,814,859     Erdmann _____ Dec. 3, 1957